(12) United States Patent
Brandt et al.

(10) Patent No.: US 6,678,033 B1
(45) Date of Patent: Jan. 13, 2004

(54) LIQUID CRYSTAL DISPLAY WITH HEATER

(75) Inventors: Peter Brandt, Aschaffenburg (DE); Dietmar Tippl, Kelkheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/522,236

(22) Filed: Mar. 9, 2000

Related U.S. Application Data

(63) Continuation-in-part of application No. 09/185,489, filed on Oct. 3, 1998, now Pat. No. 6,128,053.

(30) Foreign Application Priority Data

| Nov. 7, 1997 | (DE) | 197 49 215 |
| Oct. 22, 1998 | (DE) | 198 48 547 |
| Mar. 19, 1999 | (EP) | 99105657 |

(51) Int. Cl.[7] .......... G02F 1/1333; G02F 1/133; G02F 1/1343
(52) U.S. Cl. ................ 349/161; 349/73; 349/33; 349/147
(58) Field of Search ............... 349/161, 73, 74, 349/33, 147

(56) References Cited

U.S. PATENT DOCUMENTS

| 4,029,393 A | * | 6/1977 | Dungan et al. | 349/161 |
| 4,643,525 A | | 2/1987 | Haim | 349/161 |
| 4,723,835 A | * | 2/1988 | Franklin | 219/209 |
| 4,773,735 A | | 9/1988 | Ukrainsky et al. | 349/161 |
| 4,781,441 A | * | 11/1988 | Kanbe et al. | 349/1 |
| 4,987,289 A | | 1/1991 | Bishop et al. | 349/199 |
| 5,247,374 A | | 9/1993 | Terada | 349/161 |
| 5,559,614 A | * | 9/1996 | Urbish et al. | 349/21 |
| 5,886,763 A | * | 3/1999 | Wolkowicz et al. | 349/161 |

FOREIGN PATENT DOCUMENTS

| DE | 19505034 | 8/1996 |
| GB | 2119554 | 11/1983 |
| JP | 02-055322 A | * 2/1990 |
| JP | 11-306832 A | * 11/1999 |
| WO | 9906885 | 2/1999 |

OTHER PUBLICATIONS

Patent Abstracts of Japan vol. 017, No. 062 (P-1483), Feb. 8, 1993 & JP 04271323, Sep. 28, 1992 Fuji Photo Film Co Ltd.

* cited by examiner

Primary Examiner—Tarifur R Chowdhury
(74) Attorney, Agent, or Firm—Martin A. Farber

(57) ABSTRACT

A display device, in particular for a vehicle, having a screen which has a liquid crystal cell, with the liquid crystal cell having a front and a rear cell wall and a liquid crystal substance arranged in the cell space between these cell walls, and having a heating apparatus by which the display device can be heated. In order to ensure reliable operation of the display device even at low temperatures, the heating apparatus is arranged in the cell space of the liquid crystal cell directly or indirectly on the front and/or, on the rear cell wall, and that the heating apparatus is operated with a pure AC voltage.

29 Claims, 4 Drawing Sheets

LIQUID CRYSTAL DISPLAY WITH HEATER

RELATED APPLICATION

This application is a continuation-in-part of our application Ser. No. 09/185,489 filed Nov. 3, 1998 now U.S. Pat. No. 6,128,053, THE ENTIRE DISCLOSURE OF WHICH IS CONSIDERED AS BEING PART OF THE DISCLOSURE OF THIS CIP APPLICATION AND IS HEREBY INCORPORATED BY REFERENCE HEREIN IN ITS ENTIRETY.

FIELD AND BACKGROUND OF THE INVENTION

The invention relates to a display device, in particular for a vehicle, having a screen which has a liquid crystal cell, with the liquid crystal cell having a front and a rear cell wall and a liquid crystal substance arranged in the cell space between these cell walls, and having a heating apparatus by means of which the display device can be heated.

In liquid crystal cells which, at least at times, are operated at low ambient temperatures, for example as is the case with displays in vehicles, the problem occurs that the switching times of the liquid crystal cells become undesirably long at low temperatures, so that displays equipped with them are subject to considerable inertia. In order to overcome this undesirable situation, it is known for a light box to be provided, which is used to illuminate a liquid crystal cell in a liquid crystal display and has a heating wire. The heating wire heats the liquid crystal cell and maintains it at a temperature level which, despite low ambient temperatures, allows the liquid crystal display to be operated with the necessary short switching times. Owing to the relatively long distance between the heating wire and the liquid crystal cell, this necessitates a large amount of power being supplied and the heating wire being strongly heated in order to allow the heating required for the liquid crystal cell to be produced. Furthermore, owing to its arrangement in the light box and its necessary high level of thermal emission, the heating wire heats the entire display unit, in an undesirable manner.

SUMMARY OF THE INVENTION

The invention is based on the object of designing a display device having a liquid crystal cell such that the display unit can be operated reliably, and with only short switching times, even at low ambient temperatures.

This object is achieved according to the invention in that the heating apparatus is arranged in the cell space of the liquid crystal cell directly or indirectly on the front and/or on the rear cell wall, and in that the heating apparatus is operated with a pure AC voltage.

By virtue of such a design, the liquid crystal substance is heated directly and very quickly, without any undesirable power losses occurring as the heat is passed on. The heating power produced by the heating apparatus may thus be particularly low. This prevents parts of the display device which must not be heated from being heated undesirably. Furthermore, the heating apparatus can easily be manufactured at the same time that the liquid crystal cell is produced, without any additional assembly measures being required. Operation of the heating apparatus with a pure AC voltage ensures that the display device has a long life and is operationally reliable. If a DC voltage is applied to a heater in a liquid crystal cell which can be heated, this results in a potential difference between the contact points; the liquid crystal layer that is in direct contact with the heating apparatus is then subject to a permanent DC voltage. Depending on the magnitude of the DC voltage or of the DC voltage component of an AC voltage, this leads to the liquid crystal decomposing irreversibly in the short term or medium term, and thus reduces the life and reliability of the display apparatus to an unacceptable extent. By using a pure AC voltage according to the invention to actuate the heating apparatus, with a low DC voltage component being allowed for the purposes of tolerances that cannot be avoided with reasonable complexity, the decomposition effects described above are effectively counteracted, so that the display apparatus according to the invention is distinguished by its long life and the clarity of the display.

As a result of the direct association of the heating apparatus with the liquid crystal substance and the lack of any thermally insulating layer, the display device heating-up and switching times are particularly short. Thus—and owing to the high operational reliability described above—the display device according to the invention is also particularly suitable for a tachometer display in a motor vehicle. In the case of a tachometer, short response times, immediate operating capability and unlimited reliability are particularly important, since it is of major importance to traffic safety to display the driving speed.

The display unit has a particularly simple and economic configuration if the liquid crystal cell is, preferably, a TN or STN cell.

The production costs of the display unit can advantageously be reduced if the heating apparatus has an electrically conductive layer. When current flows, this layer can then act as a resistance heater. It would be feasible for the electrically conductive layer to be arranged immediately adjacent to the liquid crystal substance.

However, for simple liquid crystal circuitry with a power consumption that is as low as possible, it is particularly advantageous for the electrically conductive layer to be arranged between a front electrode and/or a rear electrode of the liquid crystal cell and the front and/or rear cell wall.

The production of the liquid crystal cell is even further simplified, if, according to another advantageous development of the invention, the electrically conductive layer is arranged in the same plane as a front electrode and/or rear electrode of the liquid crystal cell. The electrically conductive layer can thus be applied, together with an electrode of the liquid crystal cell, in one operation.

It would be feasible for the electrically conductive layer to have a large area; however, the heating effect is particularly good if the electrically conductive layer has a meandering profile. It is also feasible for the electrically conductive layer to be arranged only in those areas in which there are switchable display elements. The use of electrical power required for heating can thus be further reduced, since this avoids heating areas of the liquid crystal cell which are not switched, and thus where there is no negative influence from low ambient temperatures.

Particularly in the case of dot-matrix displays using a liquid crystal cell, it is normal for the liquid crystal cell to have a front electrode and a rear electrode each having families of mutually parallel electrode strips, with the electrode strips of the front electrode and rear electrode being arranged such that they cross over one another. In order to achieve a good heating effect, covering an area, with such liquid crystal cells, it is particularly advantageous for the electrode in whose plane the electrically conductive layer is arranged to be in the form of strips, and for elongated sections of the electrically conductive layer to be arranged in the spaces between the strips.

In order to ensure that the elongated sections of the electrically conductive layer are connected in a manner which does not interfere with the contact with the electrodes that are in the form of strips, plated-through contacts, which connect the plane of the front electrode and the plane of the rear electrode, preferably electrically connect the elongated sections of the electrically conductive layer to one another by means of connecting sections.

The electrodes in liquid crystal cells are normally composed of indium tin oxide. The production of a display device according to the invention is thus considerably simplified if the electrically conductive layer is composed of indium tin oxide, so that no additional material need be handled and processed during the production of the liquid crystal cell.

According to another advantageous development of the invention, the functional reliability of the display device is increased if the electrically conductive layer is covered with an electrical insulation layer. The insulation layer is advantageously composed of glass. This may be applied, sintered and fused in as a glass powder.

According to an advantageous development of the invention, the AC voltage which operates the heating apparatus can be applied directly to the electrically conductive layer, in order to keep the power losses as low as possible.

Particularly if the screen is back-lit, it is especially advantageous for the electrically conductive layer to be translucent. A very large proportion of the light emitted from a light source that is used for illumination is thus used without any significant light losses or non-uniform illumination of the screen occurring as would be the case, for example, if heating wires were used, which lead to the formation of shadows.

If, according to an advantageous development of the invention, the front and/or the rear cell wall is a glass plate, then this not only allows the screen to be back-lit (if both cell walls are glass plates), but also allows the liquid crystal cell to be produced easily and economically. Liquid crystal screens may also be illuminated by ambient lighting and/or floodlighting that is incident on them from the front. A reflector arranged in a rear area or behind the liquid crystal cell is required for this purpose, which deflects the incident light and makes the actuated areas of the liquid crystal cell visible to a viewer. It is thus particularly advantageous if the heating apparatus reflects light, so that it can carry out the function of the reflector mentioned above.

According to an advantageous development of the invention, the heating apparatus is a transflector which reflects light that is incident on the front face of the heating apparatus and transmits light that is incident on the rear face. Thus, if the surroundings are sufficiently bright, the display unit can be read without any additional light source while, if the surroundings are dark, a light source arranged behind the liquid crystal cell can be switched on in order to make the display visible.

It is particularly advantageous for the screen to have two liquid crystal cells arranged one behind the other, thus allowing compensation for any undesirable coloring of the liquid crystal cell. To do this, it is sufficient for one of the cells to be actuated actively and for the other cell to be operated purely passively, with both cells containing the same liquid crystal substance. However, it is also feasible to use two active cells connected one behind the other, thus allowing superimposed information to be displayed.

Both liquid crystal cells are preferably TN or STN cells. The need for color compensation occurs in particular with STN cells. Two STN cells arranged one behind the other, with one of the cells being operated actively and the other passively, are known by the name DSTN cell.

It would also be feasible for a heating apparatus to be provided in only one of the liquid crystal cells arranged one behind the other. In order to allow the liquid crystal substance in both cells to be heated, a large amount of heating power is then required, however. Furthermore, that liquid crystal substance which is further away from the heating apparatus will be at a lower temperature level than the liquid crystal substance directly associated with the heating apparatus. The non-uniform heating of the two substances can lead to additional, undesirable color effects. It is thus particularly advantageous for each of the liquid crystal cells to have a heating apparatus.

It would be feasible to use the entire area of the liquid crystal cell as a display area for a display. However, in many cases, only part of the area of the liquid crystal cell is envisaged as a display area, and the other areas of the cell are covered by a panel. It is then advantageous—without interfering with the capability to identify the display—for the heating apparatus to be arranged outside the display area of the liquid crystal cell.

According to another advantageous development of the invention, a temperature sensor is arranged in the cell space of the liquid crystal cell. This makes it simple to use an external electronic circuit to switch the heating apparatus on and off as required, depending on the temperature conditions in the liquid crystal cell.

In a DSTN cell that has two liquid crystal cells optically arranged in series, one of the liquid crystal cells may be provided as an active cell for producing a display, and the other liquid crystal cell as a passive cell for color compensation. In this case, according to another development of the invention, it is particularly advantageous for the screen to have a DSTN cell with an active liquid crystal cell and with a passive liquid crystal cell, with the heating apparatus being arranged in the passive liquid crystal cell. This ensures that the heating apparatus will not have any disturbing influences on the electrical actuation of the liquid crystal cell used for display purposes.

The passive liquid crystal cell in this case preferably has a front electrode and a rear electrode, and the front electrode and the rear electrode can have a voltage applied to them in such a manner that either light characters against a dark background (negative display) or dark characters against a light background (positive display) can be displayed on the screen. The type of display which can be read better in any situation—depending, for example, on the ambient brightness—can thus be selected without any additional physical complexity.

As a rule, when producing an AC voltage, it is impossible to avoid at least a low DC voltage component, without major technical complexity. According to one advantageous development of the invention, the display apparatus is particularly economic and nevertheless precise, and has a long life, if the AC voltage that operates the heating apparatus has a DC voltage component of no more than 100 mV. This low DC voltage component is too small to cause any undesirable decomposition of the liquid crystal substance.

BRIEF DESCRIPTION OF THE DRAWINGS

The invention will be explained in more detail in the following text with reference to exemplary embodiments which are illustrated in the attached figures of the drawings, in which.

DETAILED DESCRIPTION OF THE PREFERRED EMBODIMENT

Figure 1:
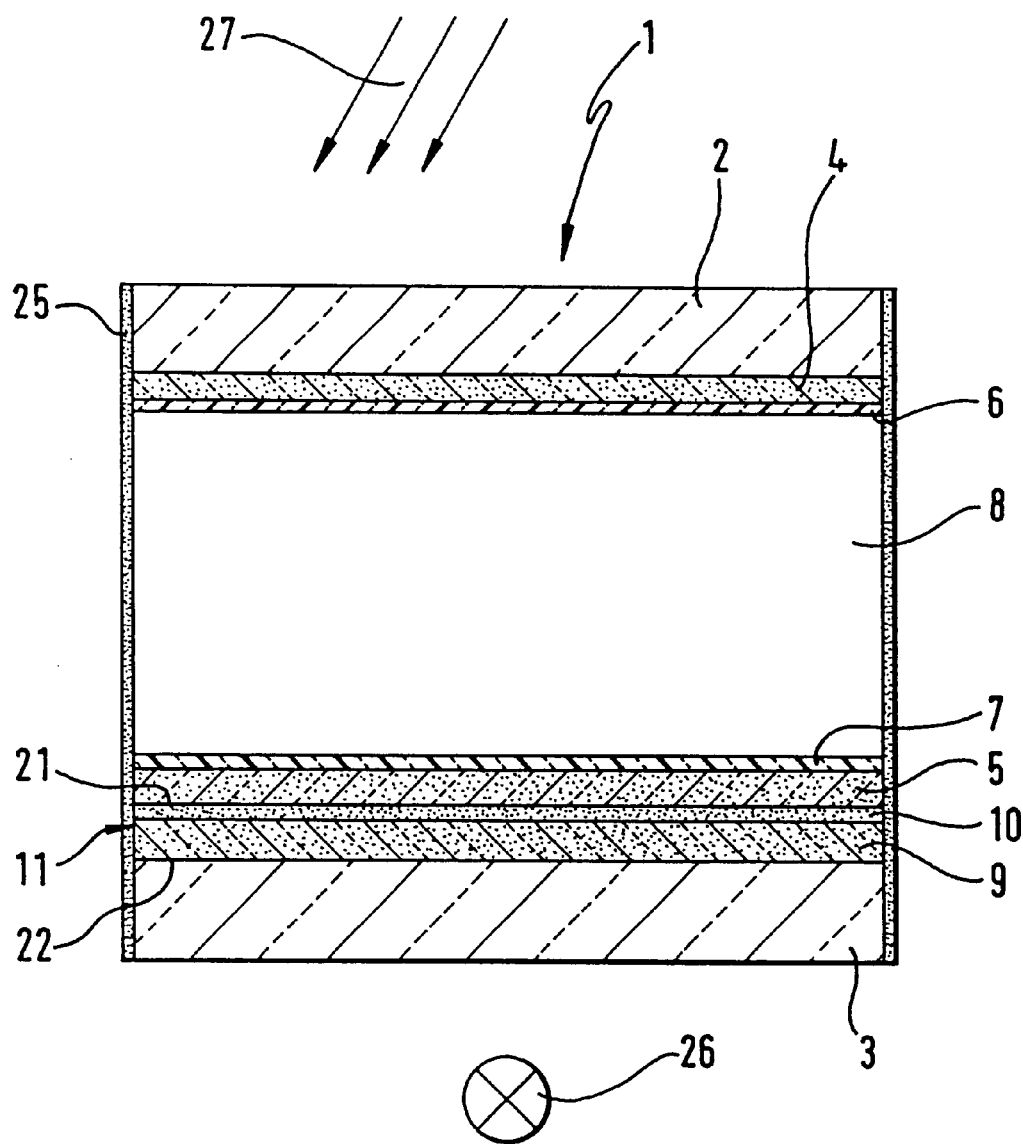
FIG. 1 shows a section view of a liquid crystal cell having a heating apparatus.

A liquid crystal cell 1, which is shown in FIG. 1 and may, for example, be part of a dot-matrix screen, has a front wall 2 and a rear wall 3. Both the front wall 2 and the rear wall 3 are formed by glass plates. A front electrode 4 composed, for example, of indium tin oxide is applied to the rear face of the front wall 2 and is covered by an electrical insulation layer 6.

A heating apparatus 11 is arranged directly on the front face of the rear wall 3, and thus on an inner wall of the liquid crystal cell 1. The heating apparatus 11 comprises a heating layer 9 which is applied to the rear wall and is composed, for example, of indium tin oxide, which is electrically insulated by means of an insulation layer 10 composed, for example, of glass powder. A rear electrode 5, which may likewise be composed of indium tin oxide, is applied to the insulation layer 10 of the heating apparatus 11, and is covered with an insulation layer 7.

A liquid crystal substance 8 is arranged between the front electrode 4 and the rear electrode 5—separated from them by the insulation layers 6, 7. The optical permeability of the liquid crystal substance 8 can be switched between individual segments of the front electrode 4 and the rear electrode 5. Bonding 25 is used not only to connect the front wall 2 and the rear wall 3 of the liquid crystal cell 1 to one another, but also to secure the liquid crystal substance 8 within the cell.

The cell is illuminated by means of a light source 26 arranged behind the liquid crystal cell 1. To this end, the heating apparatus 11 can transmit light that is incident on its rear face 22. Light beams that are incident on the front face 21 of the heating apparatus 11, for example from ambient light 27, can be reflected on the front face 21 of the heating apparatus 11, and can thus contribute to making the switched areas of the liquid crystal substance 8 visible.

Figure 2:
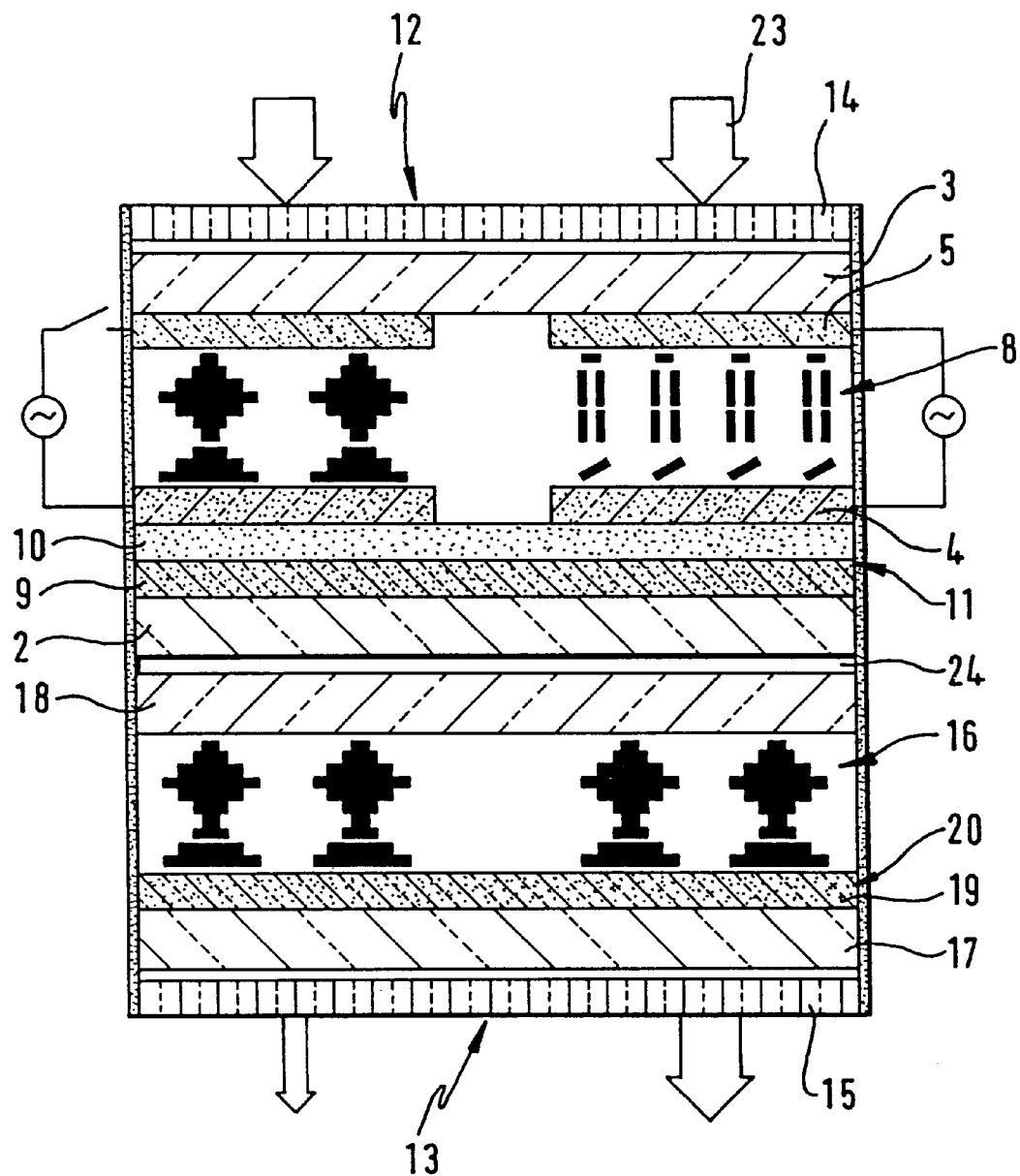
FIG. 2 shows a section view of a DSTN cell having heating apparatuses.

FIG. 2 shows a DSTN cell comprising two liquid crystal cells 12 and 13 arranged one behind the other. Identical components are in this case—as in the following figures as well—respectively provided with the same reference symbols.

A polarizer 14 is arranged on the rear face of the liquid crystal cell 12, and a polarizer 15 is arranged on the front face of the liquid crystal cell 13. A front wall 2 and a rear wall 3 of the liquid crystal cell 12 are each formed by a glass plate, in the same way as a front wall 17 and a rear wall 18 of the liquid crystal cell 13. A narrow airgap 24 is arranged between the walls 2 and 18.

The liquid crystal cell 13 is a passive cell, which is used only to compensate for undesirable color effects. A liquid crystal substance 16 of the cell 13 is thus shown schematically in the unactuated state. In contrast, the liquid crystal cell 12 is an active cell. A liquid crystal substance 8 arranged between sections of a front electrode 4 and sections of a rear electrode 5 is shown actuated in the right-hand area of the display in FIG. 2, and is indicated by the symbolically shown, applied AC voltage. On the other hand, a liquid crystal substance arranged in the left-hand area of the cell 12 is in the unactuated state.

Both the active liquid crystal cell 12 and the passive liquid crystal cell 13 are provided with a respective heating apparatus 11 and 20, respectively. The heating apparatus 20 comprises a heating layer 19 which is applied to the front wall 17 of the cell 13. Since the cell 13 is not actuated, there is no need for any additional electrical insulation layer on the heating layer 19. On the other hand, a heating layer 9 applied to the front wall 2 of the cell 12 is provided with an insulation layer 10, thus electrically decoupling the heating apparatus 11 from the front electrode 4.

The liquid crystal cells 12, 13 are illuminated by means of a back-lighting device, which is symbolized by arrows 23, with various arrows that are of the same width in the right-hand area of the display in FIG. 2 showing that the actuated cell area is translucent while, in contrast, the unactuated cell area is opaque to light (see the different arrow widths in the left-hand area of the display in FIG. 2).

Figure 3:
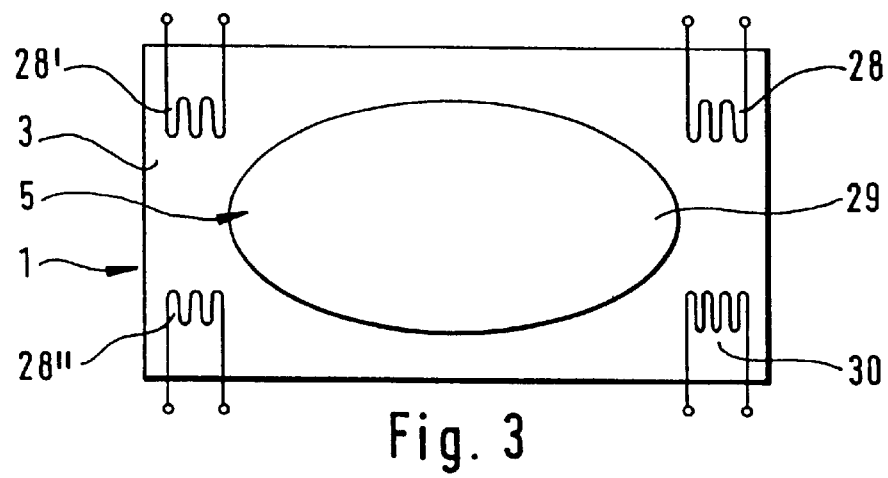
FIG. 3 shows a front view of a rear electrode of a further liquid crystal cell.

FIG. 3 shows a rear wall 3 with a rear electrode 5 of a liquid crystal cell 1, which is designed to display information in an oval display area 29. Areas of the liquid crystal cell 1 located outside the display area 29 are covered by a panel, which is not shown here. The liquid crystal cell 1 may be used, for example, to display the driving speed of a motor vehicle and may be fitted in a dashboard or a combination instrument in the vehicle. Heating apparatuses 28, 28', 28" are arranged in the same plane as the rear electrode 5 in three corner areas of the rectangular rear wall 3, which is formed by a glass plate. A temperature sensor 30 is located in the fourth corner area of the rear wall 3, in the same plane as the heating apparatuses 28, 28', 28" and the rear electrode 5. The temperature sensor 30 uses an external electrical circuit, which is not shown here, to switch the heating apparatuses 28, 28', 28" on and off, so that the interior of the liquid crystal cell 1 is maintained at an optimum operating temperature.

Figure 4:
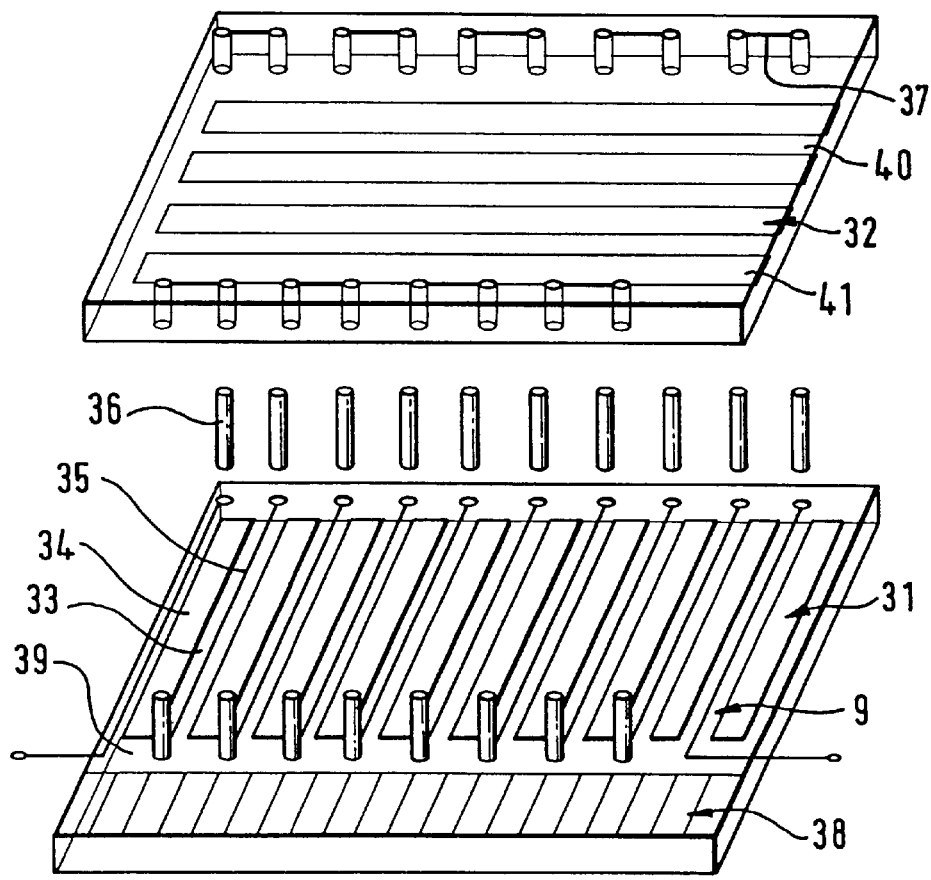
FIG. 4 shows a perspective view of a front wall and a rear wall of a further liquid crystal cell.

A front wall 39 and a rear wall 40, which are each formed by glass plates, of a liquid crystal cell in a dot-matrix display are shown in FIG. 4. In addition to a front electrode 31 in the form of strips, the front wall 39 has a connecting area 38 for electrical contact. Elongated sections 35 of a heating apparatus 9 are arranged in spaces 33 between strips 34 of the front electrode 31. Strips 41 of a rear electrode 32 are located on the rear wall 40 at right angles to the strips 34 of the front electrode 31. Plated-through contacts 36 between the elongated sections 35 of the heating apparatus 9 on the front wall 39 and connecting sections 37 on the rear wall 40 produce a continuous electrical connection within the heating apparatus 9.

Figure 5:
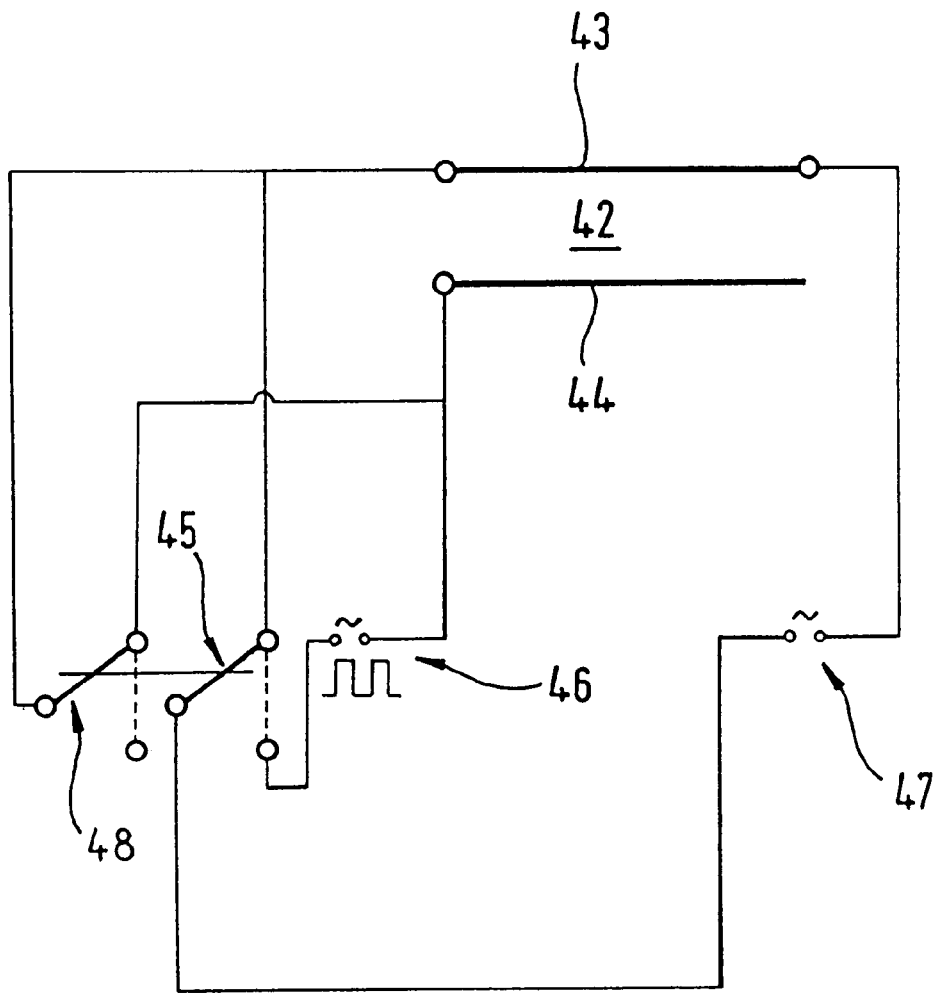
FIG. 5 shows a simplified circuit diagram for actuation of a liquid crystal cell.

For simplicity, FIG. 5 shows the passive liquid crystal cell 42 with a front electrode 43 and a rear electrode 44 of a DSTN cell which has an active liquid crystal cell for displaying information and a passive liquid crystal cell for positive/negative switching in a display apparatus. As can be seen, a changeover switch 45 can be used selectively to supply, via a power supply 46 (AC voltage source), the electrodes 43, 44 of the liquid crystal cell 42 with a driver voltage (changeover switch 45 in the position shown by dashed lines) or the front electrode 43 with a heating voltage from a power supply 47 (AC voltage source) (changeover switch 45 in the position shown by solid lines). The driver voltage causes a positive/negative changeover in the DSTN cell; this changeover may be carried out only when the heating is switched off. The heating apparatus is formed by the front electrode 43 in this exemplary embodiment.

A changeover switch 48 is coupled to the changeover switch 45 in such a way that the changeover switch 48 switches at the same time that the changeover switch 45 switches. When the heating is switched on (changeover switch 45 and changeover switch 48 in the position shown by solid lines), the changeover switch 48 produces a short circuit between the front electrode 43 and the rear electrode 44. Thus, if a heating voltage is applied to the front electrode 43, this avoids any potential difference between the front electrode 43 and the rear electrode 44, which could lead to destruction of the liquid crystal substance (not shown here) arranged between the electrodes 43, 44.

When the driver voltage is applied to the electrodes 43, 44 (changeover switch 45 in the position shown by dashed lines), the changeover switch 48 is open (position shown by dashed lines).

We claim:

1. A display device, in particular for a vehicle, comprising a screen which has a liquid crystal cell, with the liquid crystal cell having a front and a rear cell wall and a liquid crystal substance arranged in a cell space between said cell walls, and a heating apparatus by which the display device can be heated, wherein the heating apparatus (11; 20; 28) is arranged in the cell space of the liquid crystal cell (1; 12, 13; 42) directly or indirectly on a front (2; 17; 39) and/or on a rear (3; 13; 40) cell wall, and wherein the heating apparatus (11; 20; 28) is operated with an AC voltage; and wherein the AC voltage which operates the heating apparatus (11; 20; 28) has a DC voltage component of no more than 100 mV.

2. The display device as claimed in claim 1, wherein said liquid crystal cell (1; 12, 13; 42) is a TN cell or an STN cell.

3. The display device as claimed in claim 1, wherein the heating device (11; 20; 28) has an electrically conducting layer (9; 19).

4. The display device as claimed in claim 3, wherein said electrically conductive layer (9; 19) is arranged between a front electrode (4) and/or a rear electrode (5) of the liquid crystal cell (1; 12) and the front (2) and/or rear (3) cell wall.

5. The display device as claimed in claim 3, wherein said electrically conductive layer is arranged in the same plane as a front electrode (4) and/or rear electrode (5) of the liquid crystal cell (1; 12).

6. The display device as claimed in claim 5, further comprising an electrode (front electrode 31), in whose plane the electrically conductive layer (9) is arranged in the form of strips, and wherein elongated sections (35) of the electrically conductive layer (9) are arranged in spaces (33) between the strips (34).

7. The display device as claimed in claim 6, further comprising plated-through contacts (36), which connect the plane of the front electrode (31) and the plane of the rear electrode (32), to electrically connect said elongated sections (35) of the electrically conductive layer (9) to one another by connecting sections (37).

8. The display device as claimed in claim 3, wherein the electrically conductive layer (9; 90) has a meandering profile.

9. A display device as claimed in claim 8, further comprising an electrode (front electrode 31) in whose plane the electrically conductive layer (9) is arranged is in the form of strips, and wherein elongated sections (35) of the electrically conductive layer (9) are arranged in spaces (33) between the strips (34).

10. A display device as claimed in claim 9, further comprising plated-through contacts (36), which connect the plane of the front electrode (31) and the plane of the rear electrode (32), and electrically connect said elongated sections (35) of the electrically conductive layer (9) to one another by connecting sections (37).

11. The display device as claimed in claim 3, wherein the electrically conducting layer (9; 19) is composed of indium tin oxide.

12. The display device as claimed in claim 3, wherein the electrically conductive layer (9) is covered with an electric insulating layer (10).

13. The display device as claimed in claim 12, wherein said insulation layer (10) is composed of glass.

14. The display device as claimed in claim 3, wherein the AC voltage which operates the beating apparatus (11; 20; 28) is appliable directly to the electrically conductive layer (9; 19).

15. The display device as claimed in claim 3, wherein the electrically conductive layer (9; 19) is translucent.

16. The display device as claimed in claim 1, wherein the front (2; 17; 39) and/or the rear (3; 18; 40) cell wall are/is a glass plate.

17. The display device as claimed in claim 1, wherein the heating apparatus (11) reflects light.

18. The display device as claimed in claim 17, wherein said heating apparatus (11) is a transflector which reflects light that is incident on a front face (21) of the heating apparatus (11) and transmits light that is incident on a rear face (22).

19. The display device as claimed in claim 1, wherein said screen has two liquid crystal cells (12, 13) arranged one behind the other.

20. The display device as claimed in claim 19, wherein both said liquid crystal cells (12, 13) are TN or STN cells.

21. The display device as claimed in claim 19, wherein each of the liquid crystal cells (12, 13) has a said heating apparatus (11, 20).

22. The display device as claimed in claim 1, wherein the heating apparatus (28) is arranged outside a display area (29) of the liquid crystal cell (1).

23. The display device as claimed in claim 1, wherein a temperature sensor (30) is arranged in the cell space of the liquid crystal cell (1; 12, 13; 42).

24. The display device as claimed in claim 1, wherein said screen has a DSTN cell with an active liquid crystal cell (12) and with a passive liquid crystal cell (13; 42), with the heating apparatus (20) being arranged in the passive liquid crystal cell (13); 42.

25. The display device as claimed in claim 24, wherein said passive liquid crystal cell (42) has a front electrode (43) and a rear electrode 44, and wherein the front electrode (43) and the rear electrode (44) can have voltage applied to them in such a manner that either light characters against a dark background or dark characters against a light background are displayable on the screen.

26. A display device, in particular for a vehicle, comprising a screen which has a liquid crystal cell, with the liquid crystal cell having a front and a rear cell wall and a liquid crystal substance arranged in a cell space between said cell walls, and a heating apparatus by which the display device can be heated, wherein the heating apparatus (11; 20; 28) is arranged in the cell space of the liquid crystal cell (1; 12, 13; 42) directly or indirectly on a front (2; 17; 39) and/or on a rear (3; 18; 40) cell wall, and wherein the heating apparatus (11; 20; 28) is operated with an AC voltage; wherein the heating device (11; 20; 28) has an electrically conducting layer (9; 19), and the display device further comprises an electrode (front electrode 31), in whose plane the electrically conductive layer (9) is arranged in the form of strips; and wherein elongated sections (35) of the electrically conductive layer (9) are arranged in spaces (33) between the strips (34); and further comprising plated-through contacts (36), which connect the plane of the front electrode (31) and the plane of the rear electrode (32), to electrically connect said elongated sections (35) of the electrically conductive layer (9) to one another by connecting sections (37).

27. A display device, in particular for a vehicle, comprising a screen which has a liquid crystal cell, with the liquid crystal cell having a front and a rear cell wall and a liquid crystal substance arranged in a cell space between said cell walls, and a heating apparatus by which the display device can be heated, wherein the heating apparatus (11; 20; 28) is arranged in the cell space of the liquid crystal cell (1; 12, 13; 42) directly or indirectly on a front (2; 17; 39) and/or on a rear (3; 18; 40) cell wall, and wherein the heating apparatus (11; 20; 28) is operated with an AC voltage; and wherein said screen has a DSTN cell with an active liquid crystal cell (12) and with a passive liquid crystal cell (13; 42), with the heating apparatus (20) being arranged in the passive liquid crystal cell (13; 42).

28. The display device as claimed in claim 27, wherein said passive liquid crystal cell (42) has a front electrode (43) and a rear electrode 44, and wherein the front electrode (43) and the rear electrode (44) can have voltage applied to them in such a manner that either light characters against a dark background or dark characters against a light background are displayable on the screen.

29. A display device, in particular for a vehicle, comprising a screen which has a liquid crystal cell, with the liquid crystal cell having a front and a rear cell wall and a liquid crystal substance arranged in a cell space between said cell walls, and a heating apparatus by which the display device can be heated, wherein the heating apparatus (11; 20; 28) is arranged in the cell space of the liquid crystal cell (1; 12, 13; 42) directly or indirectly on a front (2; 17; 39) and/or on a rear (3; 18; 40) cell wall, and wherein the heating apparatus (11; 20; 28) is operated with an AC voltage; wherein the heating device (11; 20; 28) has an electrically conductive layer (9; 19), wherein the electrically conductive layer (9; 90) has a meandering profile; the display device further comprises an electrode (front electrode 31) in whose plane the electrically conductive layer (9) is arranged is in the form of strips, and wherein elongated sections (35) of the electrically conductive layer (9) are arranged in spaces (33) between the strips (34), and further comprising plated-through contacts (36), which connect the plane of the front electrode (31) and the plane of the rear electrode (32), and electrically connect said elongated sections (35) of the electrically conductive layer (9) to one another by connecting sections (37).

* * * * *